J. P. HISLEY.
Trace-Buckle.
No. 160,909.
Patented March 16, 1875.
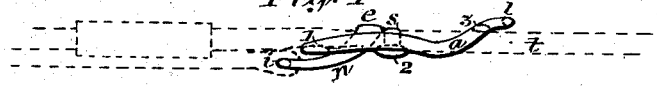
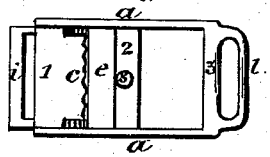
 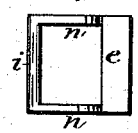 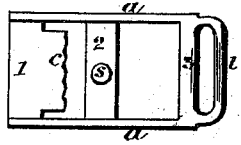
Witnesses:
Chas. H. Hey.
Edward Laass
Inventor:
John P. Hisley
pr. E. Laass Atty
James H. Mandeville
Attorney in fact

UNITED STATES PATENT OFFICE.

JOHN P. HISLEY, OF SYRACUSE, NEW YORK.

IMPROVEMENT IN TRACE-BUCKLES.

Specification forming part of Letters Patent No. 160,909, dated March 16, 1875; application filed January 2, 1875.

*To all whom it may concern:*

Be it known that I, JOHN PETER HISLEY, of Syracuse, in the county of Onondaga, in the State of New York, have invented a new and useful Improvement in Trace-Buckles, of which the following, taken in connection with the accompanying drawing, is a full, clear, and exact description.

The object of this invention is to make a buckle containing the usual requisites of strength, durability, ready attachment, and easy operation, and which is especially adapted for connecting traces to harness, so as to relieve them from wear and undue strain.

The invention relates to that class of buckles in which the body is made of curved shape, so that the trace is kept straight when subjected to strain.

The invention consists in arranging a swinging bail so that it engages with and clinches the trace in the rear of a stationary stud on the body of the buckle. It also consists in a serrated back plate upon the buckle, arranged beneath the trace, so that it is firmly bound beneath the tongue and swinging bail.

In the drawing, Figure 1 is a side view of my invention; Fig. 2, a top view; Fig. 3, a top view of the swinging bail; Fig. 4, a top view of the body of the buckle; and Fig. 5, a view of the buckle, showing its operation in disconnecting the trace.

The sides *a a* of the body of the buckle are curved, as shown in Figs. 1 and 5, bringing the bars 1 and 2 below, and bar 3 with loop *l* above, the trace *t* without bending the same. *l* is the loop to which the side strap is attached. The center bar 2 has a stationary stud, *s*, which enters one of the holes in the trace made for that purpose. *c* is a serrated back plate, cast on the bar 1, reaching about half-way to bar 2, and of such a width as to admit the sides *n n* of the swinging bail *e*. This swinging bail is attached at the round *i* to the long strap, or strap connected to the hame. The sides *n n* of the swinging bail are curved, as shown in Figs. 1 and 5, so that when strain is applied to the trace the swinging bail will slide, and at the same time brace against the bar 1, thereby drawing the trace away from the stud, and clinch it on the serrated back plate *c*, thus relieving the trace from a great portion of the wear to which it is ordinarily subjected.

It will thus be seen that the serrated back plate, in combination with the swinging bail, forms a highly-desirable feature in a buckle where great strain is applied.

The trace is easily detached or adjusted, by forcing it toward the swinging bail, which raises it off the stud *s*, and lifts the swinging bail *e*, as shown in Fig. 5.

Having thus described my invention, I claim—

The combination of the serrated back plate *c* with the swinging bail *e*, arranged in rear of the stud *s*, for partially relieving the strain at the stud by binding the trace between the tongue and the swinging bail.

In testimony whereof, I have signed my name and affixed my seal in the presence of two attesting witnesses, at Syracuse, in the county of Onondaga and State of New York, this 26th day of December, 1874.

JOHN PETER HISLEY. [L. S.]

Witnesses:
  E. S. DAWSON,
  C. F. WILLISTON.